Aug. 24, 1937.　　　　L. T. McGEE　　　　2,090,802
BEAN CUTTER
Filed Sept. 8, 1936　　　　4 Sheets-Sheet 4

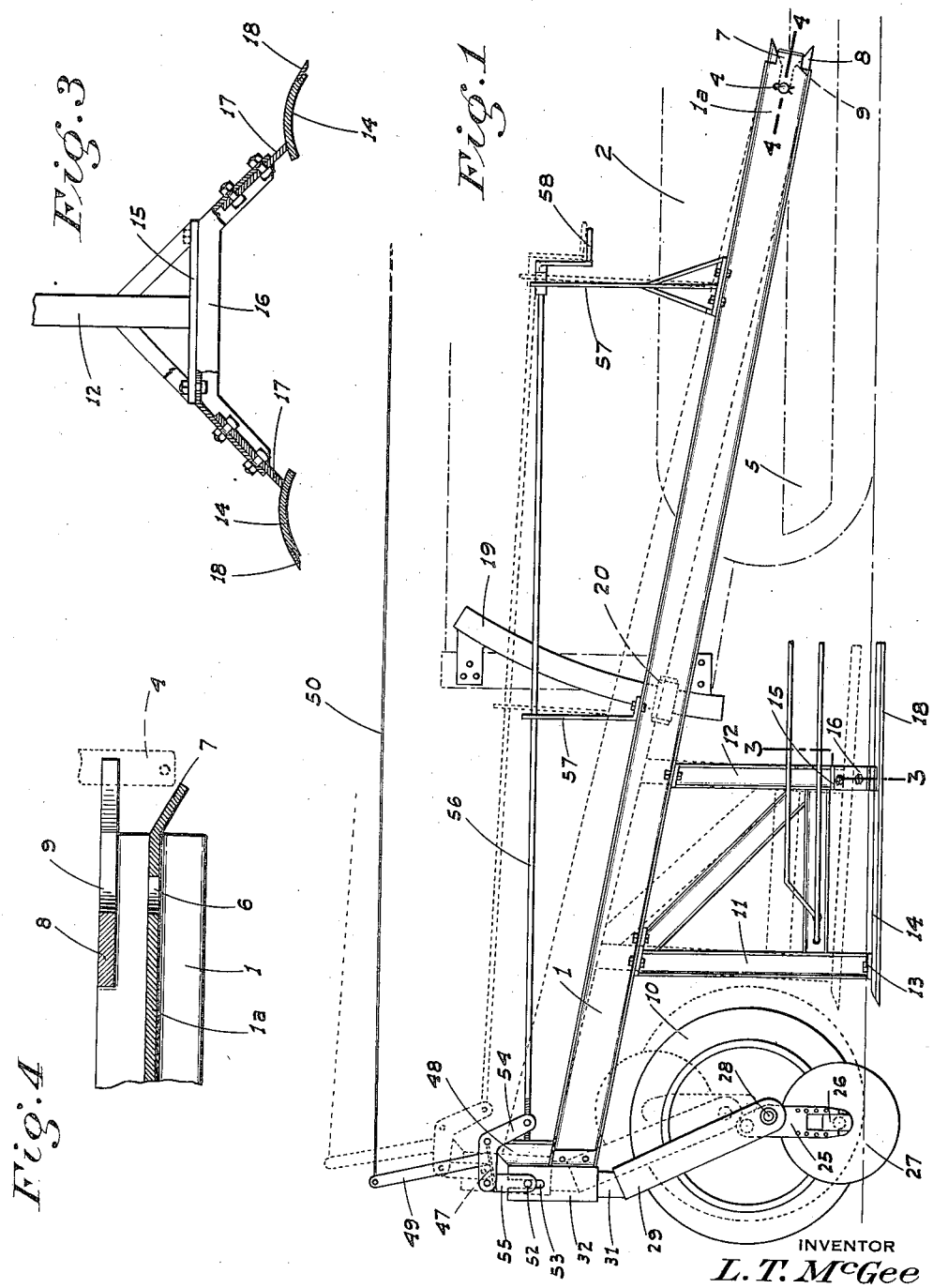

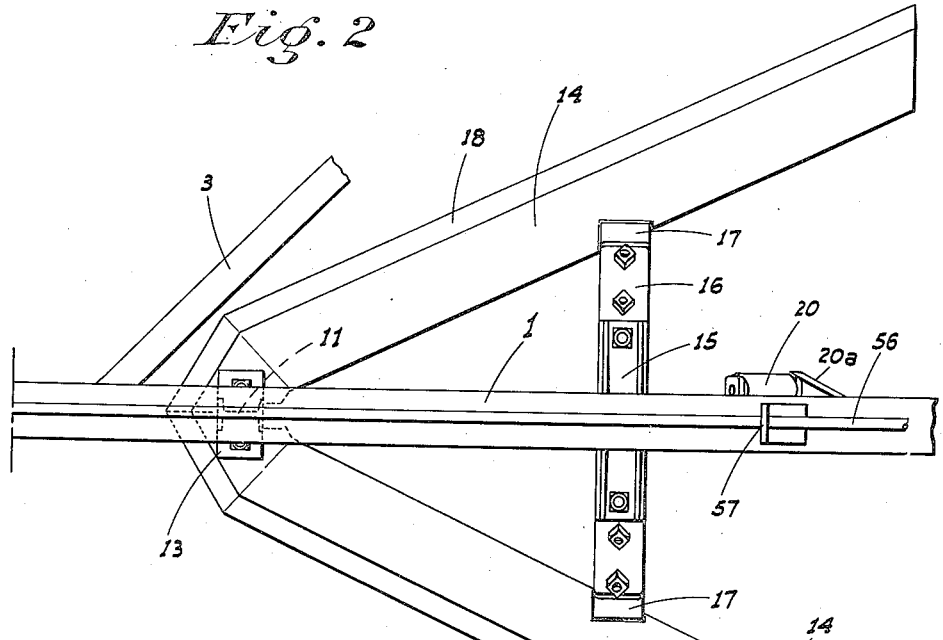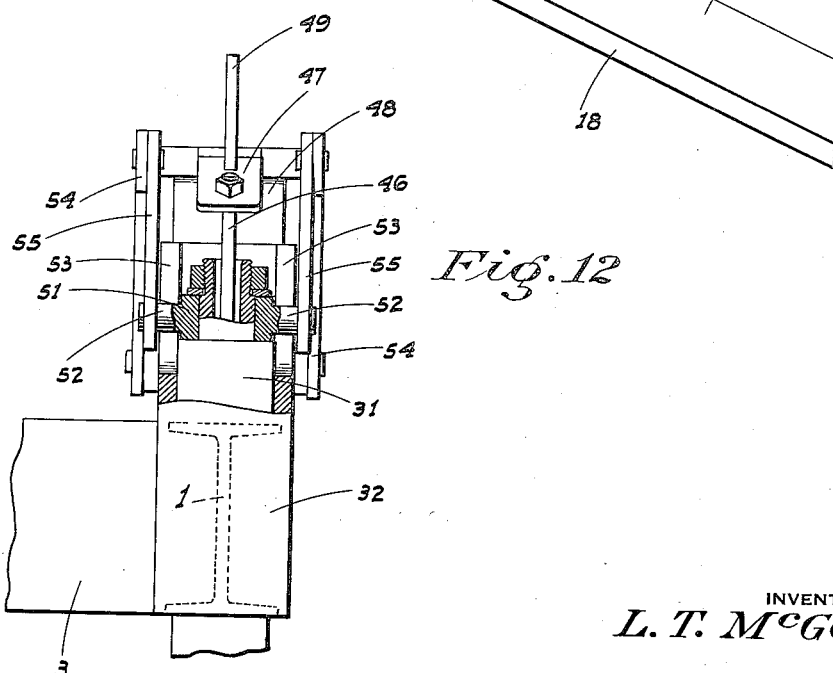

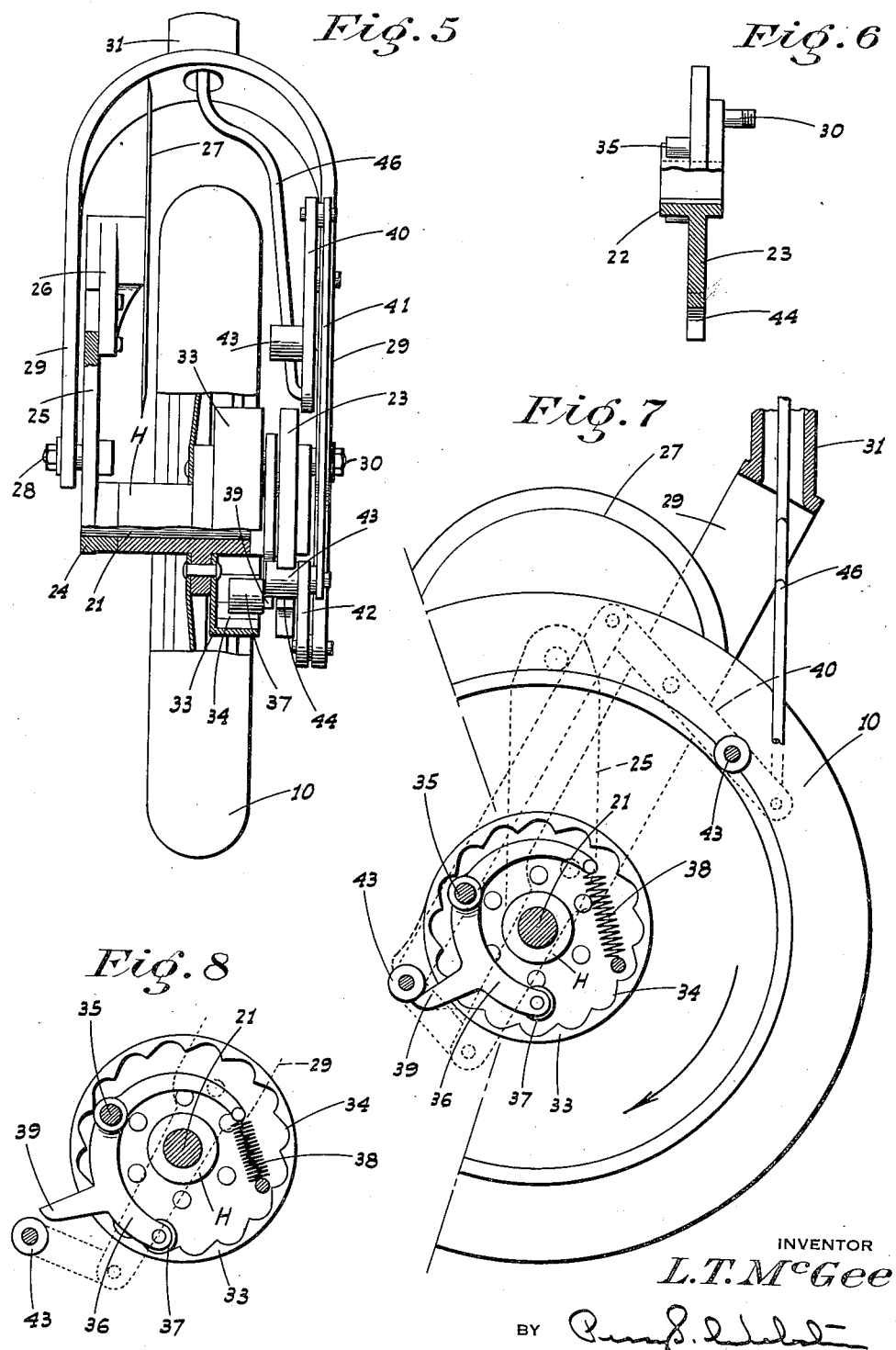

INVENTOR
L. T. McGee

BY
ATTORNEY

Patented Aug. 24, 1937

2,090,802

UNITED STATES PATENT OFFICE 2,090,802

BEAN CUTTER

Leland T. McGee, Ripon, Calif.

Application September 8, 1936, Serial No. 99,713

21 Claims. (Cl. 56—25)

The invention relates to tractor-pushed bean cutters and particularly represents improvements over the structure shown in Patent No. 1,971,495 dated August 28, 1934.

The principal object of this invention is to provide an improved and I believe novel form of power lift device for the frame of the bean cutter, so that said frame and the blades rigid therewith may be quickly raised or lowered at the option of the operator and as working conditions may require. In connection with the power lift device, I have provided a vine-splitting disc and have mounted this disc so that it is moved into or out of operating position simultaneously with the corresponding movement of the cutting blades.

Other objects of the present invention are to provide a simplified and improved mounting of the cutting blades, a more efficient and wear-free form of blade having reduced resistance against movement through the ground and an improved and simplified means for attaching the bean cutter to the tractor.

These objects I accomplish by means of such structure and relative arrangement of parts as will fully appear by a perusal of the following specification and claims.

In the drawings similar characters of reference indicate corresponding parts in the several views:

Figure 1 is a side elevation of my improved cutter as in working position.

Figure 2 is a top plan view of a blade unit.

Figure 3 is a cross section of a blade unit taken on the line 3—3 of Fig. 1.

Figure 4 is a fragmentary enlarged section on the line 4—4 of Fig. 1.

Figure 5 is an end view partly in section of a power lift unit.

Figure 6 is a detached view partly in section of the eccentrically mounted spindle-supporting disc of the unit.

Figure 7 is a fragmentary sectional elevation of the power lift unit looking from its inner side and showing the lift control member in its disengaged or inoperative position.

Figure 8 is a side view of the lift control member and adjacent cooperating cup in the operating or lifting position.

Figure 12 is a fragmentary front end view partly in section of the wheel fork spindle support, showing the control members cooperating therewith.

Figure 9:
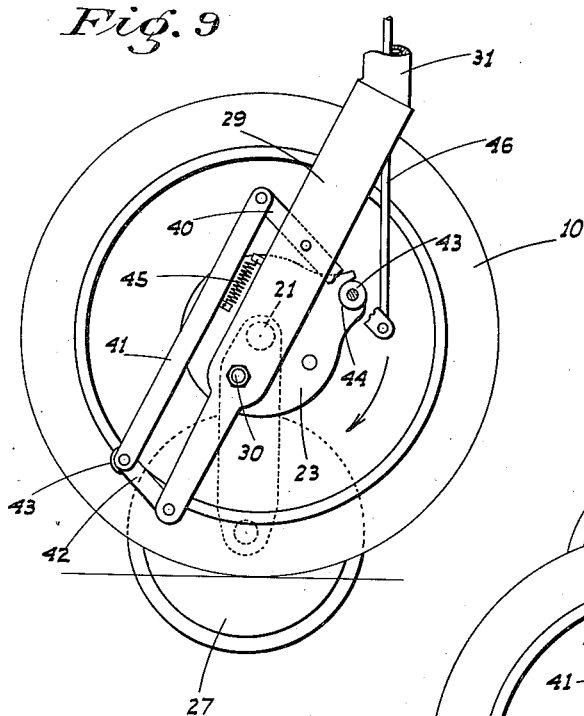
Figures 9, 10 and 11 are inner side views of a power lift unit detached, showing the position of the parts when the splitting disc is lowered, raised, and at a point intermediate its raised and lowered position respectively.

Referring now more particularly to the characters of reference on the drawings, the cutter comprises spaced side frame beams 1, disposed one on each side of a tractor 2, and suitably connected at intervals toward their forward end by cross beams 3, either as in the previous device or in any other desired manner so as to make a relatively rigid frame. Each beam supports a pair of cutter blades, a power lift unit and means to control the operation of the same; and in as much as each set of parts above outlined is a duplicate of the other, I have deemed it sufficient to show and describe only one such set.

Each beam 1 is adapted to be removably mounted on a trunnion 4 projecting outwardly from a track-frame 5 of the tractor some distance back from its front end in the following manner: the beam is of I-form and its central web 1a adjacent its rear end is provided with a hole 6 to receive the trunnion (see Fig. 4); the web at the rear end of the beam having an outwardly flaring extension 7. It is here to be noted that the trunnion projects outwardly a greater distance than the normal transverse position of the web and the extension 7 is of sufficient length to overhang the end of the trunnion when the latter is being advanced toward the beam.

At the inside of the beam 1 a plate 8 extends between and is secured to the flanges of the beam, said plate projecting some distance rearwardly of the beam and having a slot 9 open to its rear end whose walls convergingly flare to the front end of the slot where it alines with the hole 6. Thus when the tractor advances toward the frame beams, with the latter being held so that the slots are substantially in the horizontal plane of the trunnions, the latter are first engaged by the guiding walls of the slots 9, so as to initially locate the trunnions in position. The trunnions are then engaged by the flaring extensions 7, which cause the beams 1 to be spread apart sufficiently for the trunnions to engage the inner faces of the beam webs. As the trunnions reach the inner ends of the slots they are then in register with the holes 6 and the resiliency of said beams causes the trunnions to then snap into the holes. The beams are then swively mounted on the tractor and cannot be accidentally displaced.

The frame beams extend forward with an upward slope to a termination some distance in front of the tractor and each is supported at its forward end by a wheel 10, the mounting of which will be described later. Depending from the beam 1 rearwardly of the wheel and located between the wheel and the front of the tractor are front and rear posts 11 and 12 suitably braced together. The bottom of the front post 11 carries a transverse foot plate 13 which is bolted on the diverging blades 14 at the front converged end of the same as shown in Fig. 2. The rear beam 12 terminates some distance above the blades as shown in Fig. 3 and is provided on the bottom with a longer cross plate 15. This is bolted on top of an arch support 16 having diverging legs which are removably bolted on pads 17 projecting upwardly and inwardly from the blades adjacent their inner edges. In this manner the blades are rigidly yet removably supported without any braces, etc. projecting from the blades themselves to catch against or interfere with the movement of the blades through the vines.

The blades are transversely concave on their under side as shown in Fig. 3 so that the friction against the dirt and the consequent wear is reduced. Cutting strips 18 are removably secured along the outer edges of the blades and on account of the concave form of the latter and the consequent setting of the strips 18 at a downward angle, the edges of said strips are self-sharpening. Also, great rigidity of the blades is obtained.

To relieve the trunnions 4 of twisting strains a vertical guide rail 19 is mounted on each side of the tractor at the front which is engaged by a roller 20 mounted on the inner face of the corresponding beam 1; there being a deflecting or guide plate 20a fixed in connection with the beam 1 immediately ahead of the roller, to guide the rail 19 into proper position relative to the roller when the tractor is advanced into connected relationship with the cutter.

Each wheel 10 is mounted as follows: the hub H of the wheel turns on an axial spindle 21 secured at one end on the hub 22 of a disc 23 and at the other end turns in the hub 24 of a radially extending arm 25. This arm is close to the outer side of the wheel and on its outer end carries a radially adjustable bearing box 26 which supports the spindle of a splitter disc 27. The arm 25 is provided with an outwardly projecting pin 28 positioned between the spindle of the disc and which is turnably supported in one leg of the wheel-straddling fork 29. The disc 23 is provided with an outwardly projecting pin 30 positioned the same distance from the wheel spindle as the pin 28 and supported in the other leg of the fork, in such a position that the pins 28 and 30 are axially alined.

It will thus be seen that the wheel is eccentrically mounted in connection with the fork, and when the pivot pins 28 and 30 are above the wheel spindle, the splitter disc will be above the wheel spindle and the frame 1 will be raised to maintain the cutting blades clear of the ground as indicated in dotted lines in Fig. 1. When on the other hand the pins 28 and 30 are below the wheel spindle the splitter disc projects into the ground and the frame 1 is lowered to place the cutting blades in an operating position as shown in full lines in Fig. 1.

The fork is provided with a tubular spindle 31 turnable in a vertical sleeve 32 secured on the front end of the beam 1 and adjustable vertically by means hereafter described. Secured on the wheel hub H and facing the disc 23 is an annular cup 33 having a plurality of internal ratchet notches 34 extending thereabout. Turnable on an offset pin 35 projecting toward the cup from and secured on the disc 23 is an arm 36, disposed in the space between the cup and disc. This arm carries a roller 37 on its outer end which projects into the cup and is adapted to engage any notch 34 in driving relation; said arm and roller thus forming what is in effect a driving pawl. A spring 38 acts to yieldably hold the pawl in such engagement. The arm 36 is provided with a rigid stop finger 39 projecting outwardly in a direction substantially radial of the cup.

Pivoted intermediate its ends on the leg of the fork 29 adjacent the disc 23 and above the same is a lever 40. This is connected by a link 41 with an arm 42 pivoted on said leg below the disc and disposed parallel to the lever. The arm and lever on opposite sides relative to their pivot points and in diametral alinement with the pin 30, carry rollers 43 adapted to alternately seat in a peripheral recess 44 provided in the disc 23.

Figure 10:
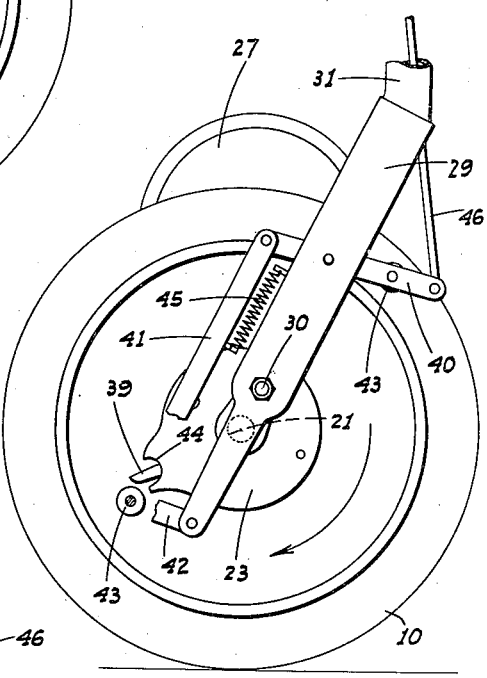
Figure 11:
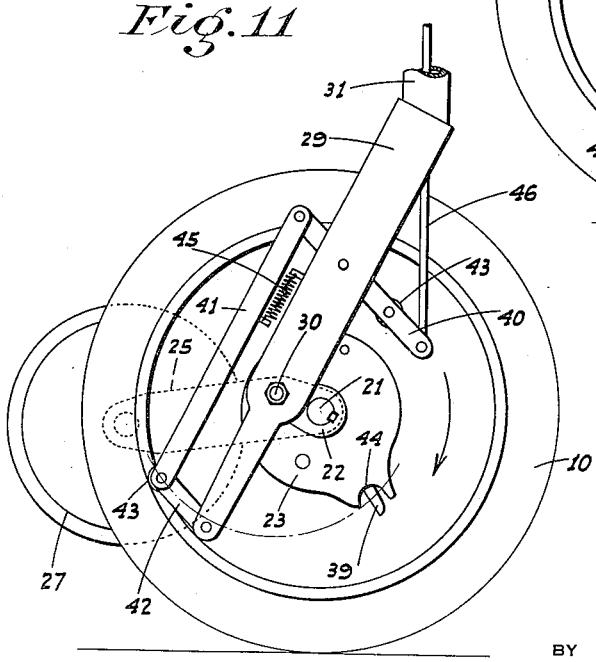

The lever is normally maintained in a position so that one roller or the other will normally engage the recess, by a spring 45 connecting the link and the fork leg. The position of the recess relative to the finger 39 (which is transversely close to the disc) is such that when the pawl is engaged in a cup notch, said finger extends across the recess as shown in Figs. 10 and 11; the length of the rollers 43 being sufficient to engage the fingers as well as the walls of the recess. When either roller is in the recess the finger is pushed to one side of the recess by the roller, causing the arm 36 to be turned on its pivot pin and the pawl-roller 37 to be withdrawn from the cup notch as shown in Fig. 7. With this position of the parts, the disc 23 is both locked against rotation and is held from any direct connection with the cup, which rotates constantly with the wheel.

When it is desired to cause the splitter disc and frame 1 to change from one position to the other, it is necessary of course to impart rotation to the disc 23, so that the position of the pivot pin on the latter is reversed relative to the wheel spindle. Such rotation of the disc also causes the arm 25 to turn correspondingly. This rotation of the disc is effected by a momentary pulling on the lever 40 so as to withdraw whichever roller 43 may then be engaged with the recess 44 and the finger 39, clear of the same. As soon as the roller leaves the recess the spring 38 is free to act and forces the pawl into an adjacent cup notch. The lever is then at once released by the operator so that the rollers 43 resume their original position, or in the path of the recess 44.

As soon as the disc 23 and the cup 33 become locked together by the pawl the disc 23 starts to rotate, causing the supporting fork 29 and the frame 1 to be raised or lowered as the case may be. As soon as the recess 44, with the rotation of the disc, reaches the other roller 43 which projects into its path, said roller enters the recess and by pressing against the finger 39 as previously described releases the pawl from driving engagement with the cup. Rotation of the disc immediately ceases and the disc and attached parts are held against further rotation as long as said roller 43 remains engaged with the disc recess. When it is again desired to change the setting of the frame and splitter disc, the lever 40 is again pulled and the movements above described again take place; the disc being automatically rotated only through a half turn at each operation, on account of the diametrically opposed position of the throw-out and locking rollers 43 as previously set forth.

The lever 40 is operated by a pull rod 46 which after bending laterally projects centrally through the fork spindle 31 to a swivel connection with an arm 47. This arm overhangs the top of spindle from the rear and is pivoted on a bracket 48 rigid with the sleeve 32. A vertical arm 49 projecting upwardly from the arm 47 has a pull cord 50 attached thereto which extends rearwardly to a termination convenient to the operator of the tractor. The rod 46 extending axially through the wheel-fork spindle, no binding is had to interfere with the freedom of swivel movement of the fork. As will be clear from Fig. 1 the fork is disposed at a rearward slant so that the wheel 10 is of the caster form and is free to swing about as the tractor is steered to one side or the other.

The spindle 31 is adjustable vertically so as to alter the operating depth of the cutting blades to suit different conditions by the following means: Turnable on the upper end of the spindle but held against longitudinal movement thereon is a collar 51 having opposed trunnions 52 slidable in vertical slots 53 cut in opposite sides of the sleeve 32 (see Fig. 12). A pair of bellcranks 34 are pivoted on the bracket 48 on opposite sides of the sleeve and are connected at one end to the trunnion by a link 55. At the other end the bellcranks are engaged in common by the threaded end of an operating screw-rod 56. This rod extends lengthwise of and above the beam 1 to a termination convenient to the tractor operator, being supported and held against lengthwise movement in brackets 57 upstanding from the beam 1. A crank handle 58 on the rear end of the rod facilitates rotation of the same.

It will thus be seen that the bean cutter as a whole is a self contained unit and there is no positive connection with the tractor other than at the trunnions 4. Connection with or disconnection of the cutter from the tractor is therefore a very simple and easy matter.

It will be noted that the coulter or splitting disc is relatively small, so that its center is close to the ground when in operative position. This is a valuable feature, since it thus presents a vertical cutting edge to the vines in the zone where the straight-ahead cut is most needed and efficient i. e. near the ground.

The relatively large wheel alongside the disc is also a necessity so as to roll down and hold the vines in position for the small disc to cut through.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A power lift device for an agricultural implement comprising, with an implement frame beam arranged at one end for movement in a vertical plane, a wheel at said end of the beam, means mounting the wheel in connection with the frame, and including a member movable vertically with the frame, means included in part with said mounting means and operable by rotation of the wheel to raise and lower said member alternately, and control means to place such last named means in operation at will.

2. A structure as in claim 1, with means included in part with said control means to automatically halt the operation of said raising and lowering means after said member has been raised or lowered a predetermined amount.

3. A structure as in claim 1 with separate means to raise and lower the frame relative to the member whereby to alter the level of the frame relative to the ground irrespective of the functioning of the power lift device.

4. A power lift device for an agricultural implement comprising, with an implement frame beam arranged at one end for movement in a vertical plane, a wheel at said end of the beam, means mounting the wheel in connection with the frame, and including a member movable vertically with the frame but mounted thereon for swivel caster movement in a horizontal plane, means included in part with said mounting means and operable by rotation of the wheel to raise and lower said member, control means to place such last named means in operation at will, and means for actuating such control means from a fixed point remote from the wheel without interfering with the freedom of swivel movement of the member.

5. A bean cutter including a frame beam, cutting blades mounted in connection with the beam, a vine splitting disc mounted ahead of and separate from the blades, means mounting the disc for swinging movement in a vertical plane, and means controlled at will to raise and lower the blades and at the same time swing the disc mounting means to raise and lower the disc out of and into the ground respectively.

6. A bean cutter including a frame beam, cutting blades mounted rigid with the beam, a vine splitting disc ahead of the blades, means mounting the disc in connection with the beam for swinging movement in a vertical plane, and means controlled at will to raise and lower the beam and simultaneously swing the disc mounting means to raise and lower the disc out of and into the ground respectively.

7. A bean cutter including a frame beam, cutting blades mounted rigid with the beam, a vine splitting disc ahead of the blades, means mounting the disc in connection with the beam for swinging movement in a vertical plane, a ground engaging wheel supporting the beam, and means controllable at will and functioning by the rotation of the wheel to raise and lower the frame and simultaneously swing the disc mounting means to raise and lower the disc out of and into the ground respectively.

8. A power lift device for an agricultural implement comprising, with an implement frame beam arranged at one end for movement in a vertical plane, a wheel at said end of the beam, a wheel-straddling fork mounted on the beam, a spindle for the wheel, members in which the spindle is mounted, means turnably mounting said members on the fork in eccentric relation to the spindle whereby when said members are rotated the fork will be raised or lowered, and selectively controlled means to thus rotate said members operably by rotation of the wheel.

9. A power lift device for an agricultural implement comprising, with an implement frame beam arranged at one end for movement in a vertical plane, a wheel at said end of the beam, a wheel-straddling fork mounted on the beam, a spindle for the wheel, members in which the spindle is mounted, means turnably mounting said members on the fork in eccentric relation to the spindle whereby when said members are rotated the fork will be raised or lowered, a disengageable driving-connection device between the wheel and one of said members, and manual means to control the engagement of said device at will.

10. A structure as in claim 9 with means incorporated in part with said manual means to automatically disengage the device after each 180° of rotative movement of the member.

11. A power lift device for an agricultural implement comprising, with an implement frame beam arranged at one end for movement in a vertical plane, a wheel at said end of the beam, a wheel-straddling fork mounted on the beam, a spindle for the wheel, members in which the spindle is mounted, means turnably mounting said members on the fork in eccentric relation to the spindle whereby when said members are rotated the fork will be raised or lowered, a circular ratchet element secured on the wheel axially thereof and facing one of said members, a pawl mounted on said member to engage the element, means tending to maintain the pawl engaged, whereby the wheel and member will be locked together for rotation as a unit, and manually controlled releasable means normally holding the pawl disengaged.

12. A structure as in claim 11 in which said last named means, when acting to hold the pawl disengaged, also acts to then lock the member against rotation.

13. A structure as in claim 11, with means between the member and releasable means and incorporated in part with the latter, to automatically move the pawl to a disengaged position once with every 180° rotation of the latter.

14. A power lift device for an agricultural implement comprising, with an implement frame beam arranged at one end for movement in a vertical plane, a wheel at said end of the beam, a wheel-straddling fork mounted on the beam, a spindle for the wheel, members in which the spindle is mounted, means turnably mounting said members on the fork in eccentric relation to the spindle whereby when said members are rotated the fork will be raised or lowered, a circular ratchet element secured on the wheel axially thereof and facing one of said members, a pawl mounted on said member to engage the element, means tending to maintain the pawl engaged, whereby the wheel and member will be locked together for rotation as a unit, a finger rigid with the pawl projecting outwardly therefrom substantially radially of the pivot connection of the member with the fork finger engaging elements normally disposed in the path of rotation of the finger and in diametrally opposed relation, the member having a peripheral recess normally engaged by one of said elements and the pawl finger being then engaged by said element and held in a position to cause the pawl to be disengaged, and manual means to move the elements clear of said recess and of the pawl finger at will.

15. In an agricultural implement adapted for attachment to a tractor, a side frame beam of I section, a trunnion adapted to be secured on and project outwardly from a tractor, the web of said beam having a hole adjacent one end to receive the trunnion, an outwardly flaring extension projecting from the adjacent end of the web, and a plate parallel to said web fixed on the beam at said end in spaced relation inwardly of the web; said plate having a trunnion receiving slot open to its outer end and terminating in line with the hole.

16. A structure as in claim 15 in which the walls of the slot diverge toward the outer end of the plate to provide for the gradual guiding of the trunnion into alinement with the hole.

17. A bean cutter comprising a longitudinal frame beam, posts depending from said beam in spaced relation along the same, a blade unit under the posts and comprising a pair of rearwardly diverging blades, means securing the front post on the blades adjacent their front end, the rear post terminating some distance above the blades, an arch member secured on and depending from said rear post, and means connecting the sides of said member at the bottom on the blades adjacent their inner edges.

18. A bean cutter including substantially horizontal vine cutting elements, and a vertical splitter disc ahead of said elements; the disc being relatively small and its center being close to the ground when the disc is in operative position whereby to present a substantially vertical splitting edge to the vines in the zone adjacent the ground.

19. A structure as in claim 18, with a means mounted in connection with the disc adjacent and to one side of the same to engage and hold the vines in position to be cut through by the disc.

20. A structure as in claim 18, with a relatively large ground engaging wheel mounted in unitary connection with the disc immediately to one side of the same.

21. In a bean cutter, a relatively long vine engaging blade adapted to extend parallel to the ground from end to end; said blade being transversely concave on its under face whereby to minimize the area of contact of said blade with the ground.

LELAND T. McGEE.